Jan. 10, 1956     L. ROSENSTEIN     2,730,555
CATALYST AND PROCESS FOR PREPARATION OF VINYL CHLORIDE
Filed Aug. 7, 1951
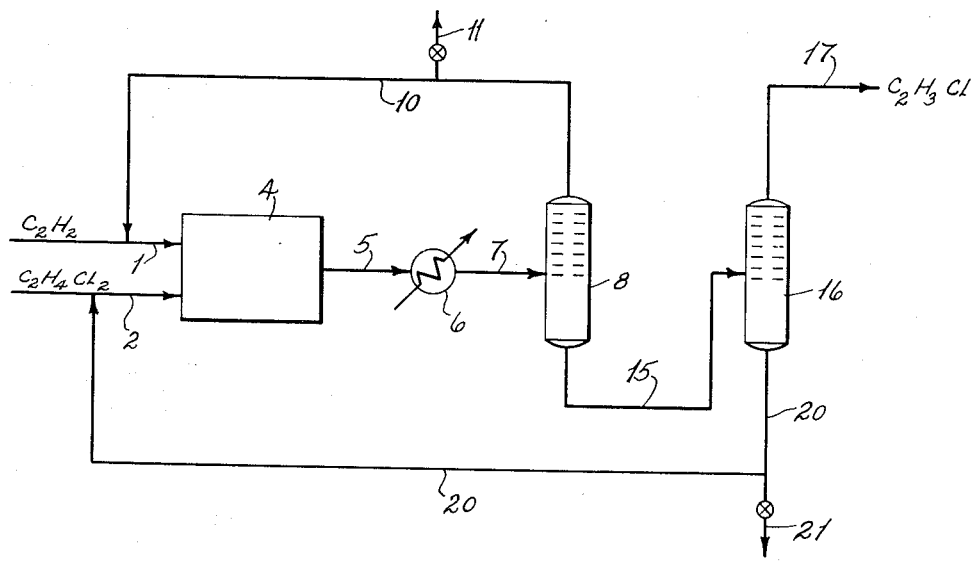
INVENTOR.
LUDWIG ROSENSTEIN
BY
ATTORNEYS

United States Patent Office 2,730,555
Patented Jan. 10, 1956

2,730,555

CATALYST AND PROCESS FOR PREPARATION OF VINYL CHLORIDE

Ludwig Rosenstein, San Francisco, Calif., assignor to Texaco Development Corporation, New York, N. Y., a corporation of Delaware Application August 7, 1951, Serial No. 240,758

1 Claim. (Cl. 260—656)

This invention relates to a process for preparing vinyl chloride by reaction of acetylene with dichloroethane. More particularly, this invention involves the discovery of the reaction conditions required for controlling the reaction of acetylene with dichloroethane to produce mainly vinyl chloride.

There are two main commercial processes for the production of vinyl chloride. One commercial process involves the pyrolysis of dichloroethane with the resulting formation of vinyl chloride and hydrogen chloride. The following equation illustrates this mode of preparation:

The other commercial process involves direct combination of acetylene with hydrogen chloride. The following equation illustrates the preparation of vinyl chloride by this process:

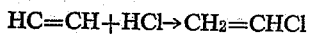

Both of these processes possess certain disadvantages. The pyrolysis of dichloroethane results in the formation of by-product hydrogen chloride whose separation from vinyl chloride is troublesome. The acetylene process requires ready access to anhydrous hydrogen chloride and has undesirable by-products such as vinyl acetylene and higher chlorine-containing acetylene polymers.

The desirability of combining these processes so that the by-product hydrogen chloride from the pyrolysis of dichloroethane combines with acetylene to yield vinyl chloride has been apparent but the discovery of reaction conditions at which the combination process is operable has eluded former investigators. There have been approaches to this goal as is evidenced by U. S. 2,158,213 disclosing a process for producing vinyl chloride by the reaction of acetylene with polychloroethanes containing at least 3 chlorine atoms per molecule at a temperature of 200 to 300° C. in the presence of a metallic halide catalyst. However, a workable effective process for the production of vinyl chloride by reaction of dichloroethane with acetylene has not been available until the present invention. There have been numerous suggestions that vinyl chloride be prepared by a two-stage process involving pyrolysis of dichloroethane in the first stage and reaction of the by-product hydrogen chloride with acetylene in the second stage. Apparently, prior investigators found the disparity in reaction conditions so great as to preclude an effective one-step process and were unable to discover the reaction conditions required for successful operation of a one-step process.

The present invention discloses the reaction conditions which must be observed in order to react dichloroethane with acetylene to produce vinyl chloride. The advantages of the process of the subject application are apparent and include the following:

The process does not entail the difficult separation of hydrogen chloride from product vinyl chloride nor does it require a source of anhydrous hydrogen chloride. Only half the product vinyl chloride is derived from acetylene whose handling and production involve certain difficulties.

In accordance with the process of the subject application, vinyl chloride is produced by reacting acetylene with dichloroethane at a temperature of 300 to 450° C., at a pressure less than 4 atmospheres and in the presence of a halide of a Group II metal. The reactants are charged to the reaction zone in a ratio of 0.8 to 2.0 mols of acetylene per mol of dichloroethane and at a rate so that an average contact time between 20 and 50 seconds is realized. Advantageously, the reaction is effected employing recycle of the normally gaseous components of the reaction effluent and of liquid dichloroethane-containing product from which vinyl chloride has been separated. The production of vinyl chloride requires that the prescribed reaction conditions be observed rigidly since any substantial variations from the prescribed conditions results either in substantially no reaction or in an uncontrolled reaction with the production of resinous polymeric substances.

Advantageously, the process of this reaction is effected in the absence of oxygen which forms peroxides with acetylene and acetylene polymers. Accordingly, the reaction zone and recovery system are usually flushed with nitrogen or carbon dioxide prior to introduction of the acetylene and dichloroethane reactants. The vinyl chloride-forming reaction may also be effected in the presence of gaseous diluents such as nitrogen or carbon dioxide.

Certain precautions are advantageously observed in the vinyl chloride recovery system in order to minimize polymerization of the reaction product. The effluent from the reaction zone is rapidly cooled and the further recovery steps, including separation of the normally gaseous components from the reaction product and fractionation of the liquid product, are effected in the absence of light.

The present invention accomplishes in one step both pyrolysis of dichloroethane and addition of resulting hydrogen chloride to acetylene. The previously discussed prior art processes required two steps to accomplish what is effected in one step in the present invention because prior investigators were unable to discover the combination of reaction conditions required to effect reaction between acetylene and dichloroethane in a unitary operation. The present invention has the additional advantage that more moderate conditions are required for the reaction of acetylene with dichloroethane than are usually necessary for the pyrolysis process because the hydrogen chloride resulting from decomposition of dichloroethane is immediately removed by reaction with acetylene to form vinyl chloride with resulting displacement of the equilibrium of the pyrolysis reaction.

The reaction of acetylene with dichloroethane is effected within a relatively narrow temperature range of 300 to 450° C. It is necessary to maintain the temperature within this range in order to effect any substantial production of vinyl chloride. A temperature between 325 and 400° C. is preferred for the reaction.

The vinyl chloride-forming reaction of this invention is effected at a pressure below 4 atmospheres and is advantageously effected at atmospheric pressure.

It is advisable to employ an excess of acetylene in the process of the present invention. The total feed to vinyl chloride-producing reaction, regardless of whether a single pass or recycle operation is employed, must have a mol ratio of acetylene to dichloroethane of 0.8 to 2.0. It is preferred, however, to effect the reaction employing the reactants in such proportions that the mol ratio of acetylene to dichloroethane is between 1.0 and 1.8.

The dichloroethane employed in the process of the invention is ordinarily the 1,2-dichloro isomer. However, the 1,1-dichloro isomer may also be employed and is found in the recycled dichloroethane fraction.

The time during which the reactants are in contact with one another is of particular importance in effecting reaction of acetylene with dichloroethane in a one-step conversion to vinyl chloride. It is necessary to employ a contact time between 20 and 50 seconds in order to obtain substantial production of vinyl chloride by the reaction of acetylene and dichloroethane. Contact times in the lower part of the specified range are employed at higher temperatures where longer contact times are used at lower temperatures. Contact times of the order of 25 to 45 seconds are employed at temperatures of 375 to 400° C.

The catalysts which are effective in the process of this invention comprise the halides of Group II metals and particularly the halides of zinc, cadmium, strontium, barium, and mercury. The mercury halides are found to be particularly good catalysts for the reaction of acetylene with dichloroethane. The activity of Group II metal halides is substantially enhanced by promotion with minor amounts, in the range of 1 to 20 per cent, of alkali metal halides such as potassium chloride. Mercury chloride-potassium chloride mixtures are particularly active catalysts. While chlorides of Group II metals are the preferred catalysts, bromides, fluorides, and iodides all are active in the conversion of dichloroethane and acetylene to vinyl chloride.

It is also possible to employ supported catalysts comprising halides of Group II metals on surface-active materials such as silica, alumina, diatomaceous earth, etc. Effective supported catalyst ordinarily comprises 20 to 50 per cent Group II metal halides and 50 to 80 per cent supporting material. An example of an effective supported catalyst is a mercurous chloride-silica gel catalyst comprising 40 per cent mercurous chloride and 60 per cent silica gel.

The maintenance of the prescribed reaction conditions results in 50 to 70 per cent per pass yields of vinyl chloride by the reaction of acetylene and dichloroethane. Ultimate yields between 75 to 95 per cent are obtained by recycle of unreacted dichloroethane and acetylene reaction. The yield figures given are based on the amount of dichloroethane charged since it is usually the minor component.

It is recommended that the vinyl chloride-producing reaction of this invention be effected with a recycle of the normally gaseous components of reactor effluent so that 0.2 to 3.0 mols of recycle gas are charged to the reaction zone per mol of acetylene fresh feed. The recycle gas ordinarily comprises a major portion of unconverted acetylene, a minor quantity of hydrogen chloride and a very small amount of vinyl chloride.

It is also advisable to recycle a dichloroethane-containing liquid fraction from which vinyl chloride has been recovered. A recycle ratio of dichloroethane-containing liquid fraction to fresh feed dichloroethane between 0.5 and 3.0 is ordinarily employed. Recycle of dichloroethane-containing liquid fraction which is the distillation residue obtained on recovery of vinyl chloride has the advantage of returning soluble or volatile halide catalyst to the reaction zone since the distillation residue often contains a small percentage of metal halide catalyst.

In the accompanying drawing there is presented a flow diagram illustrating the process of the subject application. Recycle of both the normally gaseous constituents of the reactor effluent and recycle of dichloroethane-containing liquid fraction are illustrated in the flow diagram.

Acetylene and dichloroethane in a fresh feed mol ratio of one are introduced through pipes 1 and 2, respectively, into a reaction zone 4 wherein they are contacted with a catalyst comprising 85 per cent mercurous chloride and 15 per cent potassium chloride. The reaction zone is maintained at a temperature of approximately 375° C. and at 1 atmosphere pressure. Since the reaction is exothermic, the reaction zone can be equipped with heat exchange means, not shown, to maintain the desired temperature conditions. The reactants are passed through the reaction zone at a rate sufficient to give a contact time of approximately 40 seconds.

A reactor effluent comprising vinyl chloride, unconverted reactants and reaction by-products is removed from the reaction zone 4 through a pipe 5, rapidly chilled in a heat exchanger 6, and then introduced through a pipe 7 into a stabilizer 8. In the stabilizer 8, separation of the unreacted gaseous reactants of the reactor effluent is effected.

There is removed from the upper portion of the stabilizer 8 through a pipe 10 a gas stream comprising approximately 80 to 90 per cent acetylene, 10 to 20 per cent hydrogen chloride, 0.5 to 2 per cent vinyl chloride. This gas stream is recycled to the reaction zone 4 through the pipe 10 in such quantity that a recycle ratio of recycle gas to fresh feed acetylene between 0.2 to 3.0 is obtained. Provision is made for withdrawing a portion of the gas stream through a pipe 11; acetylene may be recovered from the vented stream for use as fresh feed.

There is withdrawn from the bottom of the stabilizer 8 through a pipe 15, the liquid portion of the reactor effluent comprising vinyl chloride, unreacted dichloroethane and by-products such as polyacetylene and chlorine-containing polyacetylenes. This liquid phase is introduced into fractionator 16 wherein vinyl chloride is separated from the rest of the liquid product by fractionation. Vinyl chloride is removed from the fractionator 16 through a pipe 17.

The residue from the fractionator 16 is withdrawn by a pipe 20 and a major portion thereof is recycled therethrough to the reaction zone 4. This recycled liquid product contains a small percentage of catalyst which is removed from the reaction zone in the reaction product. The liquid residue is recycled in such quantity that a recycle ratio of liquid recycle to fresh feed dichloroethane between 0.5 and 3.0 is maintained. A portion of the liquid residue is withdrawn through the pipe 21; dichloroethane can be recovered from the withdrawn liquid residue for use as fresh feed.

The following example illustrates the production of vinyl chloride by the one-step reaction of dichloroethane with acetylene employing a mercurous chloride-potassium chloride catalyst.

Dichloroethane and acetylene are charged to a reaction zone in a 1 to 1 mol ratio; 77.2 liters of liquid dichloroethane and 22.4 cubic meters of acetylene comprise the fresh feed charge (measurements are made at standard conditions). The fresh feed acetylene and dichloroethane are combined with 58.4 cubic meters of gaseous recycle, whose composition is approximately 88 volume per cent acetylene, 11 volume per cent hydrogen chloride, and 1 volume per cent vinyl chloride, and with 154.6 liters of recycle dichloroethane-containing liquid fraction. The total feed to the reactor has an acetylene to dichloroethane mol ratio of 1.1, a recycle gas to fresh feed acetylene volume ratio of 2.6, a liquid volume ratio of recycle liquid fraction to fresh feed dichloroethane of approximately 2.0. The total feed is charged to the reactor which is maintained at a temperature of approximately 375° C. and at a pressure of one atmosphere. The total feed is charged to the reaction zone which contains a catalyst comprising 85 per cent mercurous chloride and 15 per cent potassium chloride at a rate sufficient to maintain a contact time of approximately 42 seconds. The product issuing from the reaction zone is quickly cooled and refrigerated to about —80° C. and is then discharged into a gas separator wherein separation of the product into gaseous and liquid constituents is effected. The separated gas phase is recycled to the reaction zone with the exception of 5.8 cubic meters which is vented. The liquid product is fractionated into a vinyl chloride fraction and a residual fraction which comprises mainly dichloroethane and minor quantities of by-products such as polyacetylenes and chlorine-containing polyacetylenes. All but 15.5 liters of the residual fraction is recycled to the reaction zone. The vinyl chloride product comprises 103.6 liters which is 78.5 per cent yield basis on the fresh feed charged to the reaction zone.

The foregoing example demonstrates that a good yield of vinyl chloride can be obtained by interaction of dichloroethane and acetylene in a one-step process if the prescribed conditions of temperature, pressure, mol ratio and space velocity are employed. This discovery is a substantial step forward in the chemistry of vinyl chloride which at present is much in demand for the manufacture of vinyl resins.

Obviously many modifications and variations of the invention as hereinbefore set forth may be made without departing from the spirit and scope thereof, and only such limitations should be imposed as are indicated in the appended claim.

I claim:

A process for preparing vinyl chloride which comprises: passing dichloroethane and acetylene, in a mol ratio of acetylene to dichloroethane between 1.0 and 1.8, into a reaction zone containing a catalyst of about 85% mercurous chloride and about 15% potassium chloride at rate sufficient to give a contact time between 20 and 50 seconds; effecting reaction between acetylene and dichoroethane in said reaction zone to produce vinyl chloride at a temperature between 200° and 450° F. and at a pressure less than 4 atmospheres; removing from said reaction zone a vinyl chloride-containing product; separating said product into a gaseous phase and a liquid phase; recycling a major portion of said gaseous phase to the reaction zone; distilling said liquid phase to obtain a liquid residual fraction containing catalyst, dichloroethane, polyacetylenes, and chlorine-containing polyacetylenes; and recycling at least a major portion of said residual fraction to the reaction zone.

References Cited in the file of this patent

UNITED STATES PATENTS

| | | |
|---|---|---|
| 2,391,465 | Lazier et al. | Dec. 25, 1945 |
| 2,412,308 | Weiler | Dec. 10, 1946 |

FOREIGN PATENTS

| | | |
|---|---|---|
| 894,546 | France | Dec. 27, 1944 |